United States Patent
Guarnera et al.

(10) Patent No.: US 11,954,260 B2
(45) Date of Patent: Apr. 9, 2024

(54) GESTURE AND HANDEDNESS DETERMINATION

(71) Applicants: STMicroelectronics S.r.l., Agrate Brianza (IT); STMicroelectronics (Shenzhen) R&D Co. Ltd., Shenzhen (CN)

(72) Inventors: Mirko Guarnera, La Punta (IT); Wenbin Yang, Shenzhen (CN); Enrico Rosario Alessi, Catania (IT); Fabio Passaniti, Syracuse (IT)

(73) Assignees: STMicroelectronics S.r.l., Agrate Brianza (IT); STMicroelectronics (Shenzhen) R&D Co. Ltd., Shenzhen (CN)

( * ) Notice: Subject to any disclaimer, the term of this patent is extended or adjusted under 35 U.S.C. 154(b) by 385 days.

(21) Appl. No.: 17/374,815

(22) Filed: Jul. 13, 2021

(65) Prior Publication Data
US 2023/0019962 A1   Jan. 19, 2023

(51) Int. Cl.
*G06F 3/01*   (2006.01)
*H04M 1/02*   (2006.01)

(52) U.S. Cl.
CPC .......... *G06F 3/017* (2013.01); *H04M 1/0281* (2013.01)

(58) Field of Classification Search
None
See application file for complete search history.

(56) References Cited

U.S. PATENT DOCUMENTS

| 8,059,101 | B2 | 11/2011 | Westerman et al. |
| 2006/0293921 | A1* | 12/2006 | McCarthy ............ A61B 5/6815 705/2 |
| 2014/0081175 | A1* | 3/2014 | Telfort ..................... A61B 7/04 600/586 |
| 2014/0350432 | A1* | 11/2014 | Khalfallah ........... A61B 5/4076 600/547 |

(Continued)

FOREIGN PATENT DOCUMENTS

EP   3791787 A1   3/2021

OTHER PUBLICATIONS

Akintola, et al., "Static Hand Gesture Recognition Using Multi-Layer Neural Network Classifier on Hybrid of Features," American Journal of Intelligent Systems, 2020, 7 pages.

(Continued)

*Primary Examiner* — Parul H Gupta
(74) *Attorney, Agent, or Firm* — Slater Matsil, LLP (57) ABSTRACT

A system and method for determining handedness in a device. The system including a first electrode, a second electrode, a sensor, and a processing circuit coupled to each other. The first electrode is placed at a first location, and the second electrode is placed at a second location on the device—the first location is different from the second location. The electrodes are configured to sense a variation in an electrostatic field in response to a user interacting with the device. The sensor detects a differential potential between the first electrode and the second electrode, and the processing circuit determines whether the user is interacting with the device using a left hand or a right hand. The determining is based on data received from the sensor corresponding to the differential potential.

26 Claims, 3 Drawing Sheets

(56) References Cited

U.S. PATENT DOCUMENTS

| | | | | |
|---|---|---|---|---|
| 2015/0053227 | A1* | 2/2015 | Sugunan | A45D 7/00 132/142 |
| 2015/0089386 | A1* | 3/2015 | Brisebois | G06F 3/04817 715/746 |
| 2019/0307373 | A1* | 10/2019 | Nyberg | A61B 5/4266 |
| 2021/0081032 | A1 | 3/2021 | Passaniti et al. | |

OTHER PUBLICATIONS

Amir, Arnon et al., "A Low Power, Fully Event-Based Gesture Recognition System," In Proceedings of the IEEE Conference on Computer Vision and Pattern Recognition, 2017, pp. 7243-7252.

Avery, Jeff et al., "Holding Patterns: Detecting Handedness With a Moving Smartphone at Pickup, " IHM'19, Dec. 1-3, 2019, Grenoble, France, 7 pages.

Avery, Jeff et al., "Holding Patterns: Detecting Handedness With a Moving Smartphone at Pickup," HAL Id: hal-02381590, https://hal. archives-ouvertes.fr/hal-02381590, IHM'19, Dec. 2019, Grenoble, France, 8 pages.

Bu, Xiangui, "Human Motion Gesture Recognition Algorithm in Video Based on Convolutional Neural Features of Training Images," IEEE Access, vol. 8, Aug. 28, 2020, pp. 160025-160039.

Chistyakov, et al., "Gesture recognition system based on Convolutional neural Networks," IOP Conference Series: Materials Science and Engineering 498, Open Access, 2019, 7 pages.

Fahr Jr., Michael, "Investigating Machine Learning Techniques for Gesture Recognition with Low-Cost Capacitive Sensing Arrays," Undergraduate Honors Theses, Retrieved from https://scholarworks. uark.edu/csceuht/82, Department of Computer Science College of Engineering University of Arkansas, Fayetteville, AR, May 2020, 31 pages.

Guo Hansong et al., "Recognizing the Operating Hand and the Hand-Changing Process for User Interface Adjustment on Smartphones," Sensors, 2016, 16, 1314, www.mdpi.com/journal/sensors, 29 pages.

Henriet, Gildas, "ST Sensors, It is all about Simplicity and Performances," STMicroelectronics, STlife.augmented, Distribution EMEA, Sep. 2020, 65 pages.

Mohammed, Adam Ahmed Qaid, et al., "A Deep Learning-Based End-to-End Composite System for Hand Detection and Gesture Recognition," www.mdpi.com/journal/sensors, Sensors, Nov. 30, 2019, 19, 23 pages.

Moin, Ali et al., "An EMG Gesture Recognition System with Flexible High-Density Sensors and Brain-Inspired High- Dimensional Classifier, " 2018 IEEE International Symposium on Circuits and Systems, 2018, 5 pages.

Muhlbacher-Karrer, Stephan et al, "A Driver State Detection System-Combining a Capacitive Hand Detection Sensor With Physiological Sensors," IEEE Transactions on Instrumentation and Measurement, vol. 66, No. 4, Apr. 2017, 13 pages.

Mujibiya, Adiyan et al., "Mirage: Exploring Interaction Modalities Using Off-Body Static Electric Field Sensing," Sensing, UIST13, Oct. 8-11, 2013, St. Andrews, UK, 10 pages.

Wei, Haoyu et al., "Alternating Electric Field-Based Static Gesture-Recognition Technology," Senors, www.mdpi.com/journal/sensors, 2019, 15 pages.

* cited by examiner

GESTURE AND HANDEDNESS DETERMINATION

TECHNICAL FIELD

The present disclosure relates generally to electronic technology, and, in particular embodiments, to systems, methods, and devices for determining handedness and gesture recognition.

BACKGROUND

Electronic devices typically include interfaces that allow interactions between a user and the electronic device. For example, a mobile device can include one or more configurable switches, force-sensitive features, or capacitive sensing buttons that allow interfacing with the mobile device through, for example, scrolling, adjusting device volume, powering ON, or the like.

Generally, where the interactive interface is configurable based on handedness, the configuration selection is adjusted manually, which can be burdensome, time-consuming, and adds an unintuitive interaction period before configuration. An efficient and robust system and method that provides an automatic configuration of the interactive interface based on handedness and that can similarly be used for gesture recognition is desirable.

SUMMARY

A first aspect relates to a circuit for a device; the circuit includes a first electrode configured to be placed at a first location on the device; a second electrode configured to be placed at a second location on the device, the first location and the second location being different locations on the device, the first electrode and the second electrode configured to sense a variation in an electrostatic field in response to a user interacting with the device; a sensor coupled to the first electrode and the second electrode, the sensor configured to detect a differential potential between the first electrode and the second electrode; and a processing circuit coupled to the sensor, the processing circuit configured to determine whether the user is interacting with the device using a left hand or a right hand, the determining based on data received from the sensor corresponding to the differential potential.

In the first implementation form of the circuit according to the first aspect, wherein the device is a handheld device, and wherein the processing circuit is further configured to update an interface on the device in response to determining whether the user is interacting with the device using the left hand or the right hand, the interface used by the user to interact with the device.

In a second implementation form of the circuit, according to the first aspect as such or any preceding implementation of the first aspect, wherein the user interacting with the first electrode includes a transfer of electric charge, a charge induction, or a charge polarization at the first electrode.

In a third implementation form of the circuit, according to the first aspect as such or any preceding implementation of the first aspect, wherein passively sensing the variation in the electric field includes sensing an electric potential induced at the first electrode in response to the user interacting with the first electrode.

In a fourth implementation form of the circuit, according to the first aspect as such or any preceding implementation of the first aspect, wherein the sensor is further configured to attenuate signal noise from the differential potential based on signals received from the second electrode, the signal noise corresponding to events unrelated to the user interacting with the first electrode; and amplify the differential potential after attenuating the signal noise.

In a fifth implementation form of the circuit, according to the first aspect as such or any preceding implementation of the first aspect, the circuit further includes a plurality of electrodes, wherein the first electrode is configured to have a common reference with each of the other electrodes.

In a sixth implementation form of the circuit, according to the first aspect as such or any preceding implementation of the first aspect, the circuit further includes an on-device machine learning capable process, wherein the determining further includes determining based on an artificial neural network model.

In a seventh implementation form of the circuit, according to the first aspect as such or any preceding implementation of the first aspect, wherein the first electrode is placed diagonally in relation to the second electrode on a plane parallel to a back-side of the device.

In an eight implementation form of the circuit, according to the first aspect as such or any preceding implementation of the first aspect, wherein the plurality of electrodes are exposed on a surface of the device, and the user interacting with the device includes the user directly touching the first electrode.

In a ninth implementation form of the circuit, according to the first aspect as such or any preceding implementation of the first aspect, wherein one or more of the plurality of electrodes are placed underneath a surface of a device, and the user interacting with the device includes the user touching a dielectric cap placed between the first electrode and a contact point on the device.

A second aspect relates to a method; the method includes sensing a first variation in an electric polarization at a first electrode of a device and a second variation in an electric polarization at a second electrode of the device located at a different location from the first electrode on the device; measuring a differential potential between the first electrode and the second electrode in response to a user interacting with the device; and determining whether the user is interacting with the device using a left hand or a right hand based on the differential potential.

In a first implementation form of the method according to the second aspect as such, the method further includes updating an interface on the device in response to determining whether the user is interacting with the device using the left hand or the right hand, the interface used by the user to interact with the device.

In a second implementation form of the method, according to the second aspect as such or any preceding implementation of the second aspect, wherein the user interacting with the first electrode includes a polarization or a charge induction or a transfer of electric charge from the user to the first electrode.

In a third implementation form of the method, according to the second aspect as such or any preceding implementation of the second aspect, wherein passively sensing the variation in the electric field includes sensing an electric potential induced at the first electrode in response to the user interacting with the first electrode.

In a fourth implementation form of the method, according to the second aspect as such or any preceding implementation of the second aspect, wherein the detecting includes attenuating signal noise from the differential potential based on signals received from the second electrode, the signal noise corresponding to events unrelated to the user interacting with the first electrode; and amplifying the differential potential after attenuating the signal noise.

In a fifth implementation form of the method, according to the second aspect as such or any preceding implementation of the second aspect, wherein the determining further includes determining based on an artificial neural network model.

In a sixth implementation form of the method, according to the second aspect as such or any preceding implementation of the second aspect, wherein a training of the artificial neural network model is based on an initial subset of data corresponding to the differential potential.

In a seventh implementation form of the method, according to the second aspect as such or any preceding implementation of the second aspect, the method further includes: activating a sensor for the measuring of the differential potential in response to detecting a displacement of the device; and deactivating the sensor in response to detecting that the device is in a static position for a threshold period of time.

A third aspect relates to a device; the device includes: a first electrode configured to be placed at a first location on the device; a second electrode configured to be placed at a second location on the device, the first location and the second location being different locations on the device, the first electrode and the second electrode being configured to sense a variation in an electric field in response to a user interacting with the device; a non-transitory memory storage including instructions; a processor in communication with the non-transitory memory storage, the first electrode, and the second electrode, wherein the processor is configured to execute the instructions to detect a differential potential between the first electrode and the second electrode; and determine whether the user is interacting with the device using a left hand or a right hand, the determining based on data received from the sensor corresponding to the differential potential In a first implementation form of the device according to the third aspect, wherein the processor is configured to execute the instructions to update an interface on the device in response to determining whether the user is interacting with the device using the left hand or the right hand, the interface used by the user to interact with the device.

In a second implementation form of the device, according to the third aspect as such or any preceding implementation of the third aspect, wherein passively sensing the variation in the electric field includes sensing an electric potential induced at the first electrode in response to the user interacting with the first electrode.

In a third implementation form of the device, according to the third aspect as such or any preceding implementation of the third aspect, wherein the processor is configured to execute the instructions to attenuate events unrelated to the user interacting with the first electrode based on signals received from the other electrodes; and amplify an electric potential induced at the first electrode in response to a signal received from the first electrode.

In a fourth implementation form of the device, according to the third aspect as such or any preceding implementation of the third aspect, wherein the determining further includes determining based on an implementation of an artificial neural network.

In a fifth implementation form of the device, according to the third aspect as such or any preceding implementation of the third aspect, wherein a training of the artificial neural network is based on an initial subset of data corresponding to the differential potential.

A fourth aspect relates to a method; the method includes passively sensing a change in a first electric field at a first electrode of a device and a change in a second electric field at a second electrode of the device located at a different location from the first electrode on the device; detecting a variation in differential potential based on the first electric field and the second electric field in response to a movement of an object relative to the device; and determining a direction of motion of the object relative to the device based on the variation in the differential potential.

In a first implementation form of the method according to the fourth aspect, wherein the variation in the differential potential corresponds to a variation over time in accordance with placement of the first electrode with respect to the second electrode.

Embodiments can be implemented in hardware, software, or in any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise.

Variations or modifications described to one of the embodiments may also apply to other embodiments. Further, it should be understood that various changes, substitutions, and alterations can be made herein without departing from the spirit and scope of this disclosure as defined by the appended claims.

While inventive aspects are described primarily in the context of a mobile device, it should be appreciated that these inventive aspects may be similarly applicable to any electronic device with a configurable or interactive interface that benefits from a determination of handedness or gesture recognition. For example, embodiment methods and systems described herein can be similarly applied to a television remote, a computer mouse, a tablet, a game console, a game console remote, a smartwatch, an electrocardiogram (ECG or EKG) electrode, or the like.

Further, although the inventive aspects are primarily described in the context of an artificial neural network model, it should be appreciated that other types of machine learning models are similarly contemplated. For example, the artificial neural network model described herein can be replaced with other machine learning models such as a decision tree model, a support-vector network model, a regression analysis model, a Bayesian network model, a genetic algorithm model, or the like.

A determination of handedness refers to detecting the hand, dominant hand, or least dominant hand that a user uses to interact with a device. For example, in instances where the user interacts with the device with a single hand (e.g., television remote, small mobile device, computer mouse, etc.), the determination of handedness refers to the hand that the user uses to make selections on the device.

In other instances, where the user interacts with the device using both hands, the determination of handedness may refer to a determination as to, for example, the dominant hand or a configuration adjustment that places a preference for specific interactions based on the dominant hand. In embodiments, the determination of handedness encompasses determining the least dominant hand and adjusting interfaces on the device based thereon.

Existing devices typically use capacitive sensing technology, image recognition technology, or time-of-flight technology to determine handedness or for gesture recognition.

Capacitive sensing technology uses capacitive sensors located along the edge or side of the device to sense the holding pattern or determine proximity of the user's hand with respect to the device. Capacitive sensing suffers from poor sensitivity over few centimeters—typically limited to 1 cm. Additionally, the placement of capacitive sensors along the edge or side of the device reduces the availability of valuable volume that can be used for, for example, antennas or switches.

Image recognition technology uses one or more cameras to determine the holding pattern of the user's hand on the side of the device or to detect a gesture. Image recognition technology suffers from being too processor-heavy with high power consumption for low-end portable and mobile devices. Furthermore, the low frame rate of a camera is usually insufficient to follow fast hand movements.

Time-of-flight technology uses a light emitter and a matrix of detecting cells to determine the holding pattern of the user's hand on the side of the device or gesture recognition. Time-of-flight technology suffers from the high power consumption of the light source and detectors used to detect the reflected light.

Embodiments of this disclosure provide techniques for determining handedness or gesture recognition based on the user's direct interaction or indirection interaction (e.g., movement or placement of the hand in the vicinity) of the device. In response, the device's processor automatically configures the device for optimal adaptive behavior for the benefit of the user.

Aspects of this disclosure include a device with two or more passive electrodes. In embodiments, a variation in an electric field near the electrode induces on it a polarization, hence a voltage, proportionate to the variation itself, without the device having to generate the electric field purposefully.

In embodiments, a user places their hand near or on the electrode. In embodiments, the electrode is directly coupled to the user when the user's hand makes contact with the electrode. In such an embodiment, the electrode is placed on the surface of the device. In embodiments, the electrode is not directly coupled to the user but is separated with, for example, a dielectric cap. In such an embodiment, the user indirectly interacts with the electrode. In each embodiment, the electrode can measure a change in polarization at the electrode.

In an embodiment, the user places their left hand or right hand over one electrode. In a dual-electrode configuration, the positioning of the hand over one of the two electrodes creates an imbalance of potential between the two electrodes. The differential potential between the two electrodes is isolated and amplified by a sensor coupled to the electrodes. A processor determines handedness by analyzing a signal from the sensor corresponding to the differential potential.

It is noted that when the user's hand covers both electrodes or when the change in the electrostatic field is the same at both electrodes, the differential input from the electrodes cancels out the induced common-mode signal. Thus, in an ideal setup, the differential output signal is zero. In embodiments, the system remains in the previous configuration. For example, if the device is configured for a right-handed user, the system remains in that configuration.

In another embodiment, two electrodes are placed diagonally from each other. One or both electrodes sense a variation of electrostatic field over time in response to a user making a gesture in the vicinity of one or both electrodes. The change in the electric field sensed by one or more electrodes is due to the user interacting with the environment around the respective electrode, which induces an electric potential at the respective electrode. A dynamic variable associated with the electric potential change is isolated and amplified by a sensor connected to the electrodes. The processor determines the type of gesture (e.g., a left-to-right swipe, right-to-left swipe, etc.) by analyzing a signal from the sensor corresponding to the dynamic variable over time.

In both cases, the processor can improve the determination by implementing an on-device machine learning capable system architecture, such as artificial neural networking (ANN) or the like. The self-learning capability enables the device to produce better results as more data becomes available, enhancing determination accuracy, and improving processing efficiencies. These and other details are discussed in greater detail below.

Figure 1:
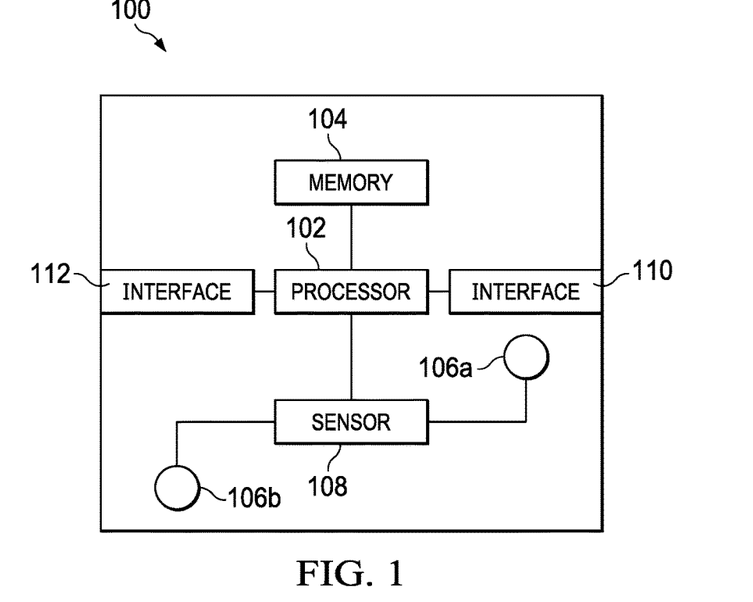
FIG. 1 is a diagram of an embodiment electronic device.

FIG. 1 illustrates a diagram of an embodiment electronic device 100, which includes a processor 102, a memory 104, electrodes 106*a-b*, a sensor 108, and interfaces 110-112, which may (or may not) be arranged as shown in FIG. 1. The collective that includes processor 102, memory 104, electrodes 106*a-b*, and sensor 108 is referred to herein as the determining system. Electronic device 100 may include additional components not depicted in FIG. 1, such as an accelerometer, a gyroscope, long term storage (e.g., non-volatile memory, etc.).

Processor 102 may be any component or collection of components adapted to perform computations or other processing-related tasks related to the methods disclosed herein. Processor 102 can be, for example, a microprocessor, a microcontroller, a control circuit, a digital signal processor, a field-programmable gate array (FPGA), an application-specific integrated circuit (ASIC), a system-on-chip (SoC), or combinations thereof. In embodiments, processor 102 is a machine-learning core (MLC) residing in an ASIC. In such an embodiment, the ASIC can be integrated in, for example, a microelectromechanical systems (MEMS) component.

Electronic device 100 is shown to have a single processor; however, in some embodiments, multiple processors may be included. The various functions herein attributed to processor 102 may be distributed across these multiple processors. In embodiments, processor 102 may be a dedicated circuit. In other embodiments, processor 102 may refer to an existing processing unit of electronic device 100.

In embodiments, processor 102 includes an artificial neural networking model-type architecture. In other embodiments, an artificial neural networking processor (not shown) is coupled to processor 102. The artificial neural network allows processor 102 to utilize machine learning capabilities to identify small variations in the electric field and to accurately and efficiently determine handedness or recognize gestures.

Processor 102 and the embedded or external artificial neural networking processor may be located on the same die or on a separate die. The artificial neural networking processor may be an existing processing unit of electronic device 100 utilized for various artificial intelligence (AI) type determinations in the electronic device 100 and, thus, not limited to the methods disclosed herein.

Memory 104 may be any component or collection of components adapted to store programming or instructions for execution by the processor 102. In an embodiment, memory 104 includes a non-transitory computer-readable medium. The non-transitory computer-readable medium includes all types of computer-readable media, including magnetic storage media, optical storage media, flash media, and solid-state storage media.

It should be understood that software can be installed in and sold with electronic device 100. Alternatively, the software can be obtained and loaded into electronic device 100, including obtaining the software through a physical medium or distribution system, including, for example, from a server owned by the software creator or from a server not owned but used by the software creator. The software can be stored on a server for distribution over the Internet, for example.

In embodiments, memory 104 is a dedicated memory storage for storing instructions or data specific to detecting gestures and determining handedness. In other embodiments, memory 104 may refer to existing memory storage of electronic device 100.

Electrodes 106*a-b* are passive components that detect an electric potential induced at the respective electrode in response to an external environmental electrostatic field. Electrodes 106*a-b* do not require a separate emitting electrode to generate an electric field. Each electrode provides a separate sensing channel that senses a variation of the electric field in response to a user making contact with the electrode or modifying the electric field surrounding the electrode.

In the embodiments of this disclosure, unlike in mutual capacitive sensing or passive capacitive sensing, the electric field that is changed is not purposefully generated by any component of the electronic device 100.

When the user's hand enters the detection area of electrodes 106*a-b*, a charge on the user's hand is redistributed under the action of the surrounding electric field. The charge redistribution causes a disturbance to the original electric field, which causes a polarization at the electrodes 106*a-b*.

Generally, an electrode includes at least two layers. The first layer provides an external interface to the environment surrounding the electronic device 100, which in response to an external electrostatic field becomes polarized. The first layer typically consists of a dielectric material, characterized as a good insulator with good relative electric permittivity. For example, the first layer may be Teflon™, Kapton™, glass, polyester, polyester, metal oxides, or the like. The second layer consists of a conductive material, which senses the potential of the first layer. For example, the second layer may be metal (e.g., copper), a metal alloy, or the like.

The potential induced at electrodes 106*a-b* varies depending on, for example, the size, geometry, and placement of electrodes 106*a-b* with respect to each other and electronic device 100.

Electrodes 106*a-b* have a common reference, and the change in the electric field by the movement of a user's hand or contact with an electrode induces an electric potential at the electrodes 106*a-b*. Because electrodes 106*a-b* have a common reference, the difference in distance between each electrode and the user's hand provides a detectable differential potential between the electrodes at each moment in time.

As shown, electrodes 106*a-b* are placed diagonally from each other. The placement of the electrodes 106*a-b* in this configuration, advantageously, minimizes the number of electrodes required to distinguish between hand movements at or covering movements at the top, bottom, left, and right side of the electronic device 100.

Electrode 106*a* is placed at the top right of electronic device 100, and electrode 106*b* is placed at the bottom left of electronic device 100. Thus, with at least two electrodes, embodiments of this disclosure can differentiate between any combination of the top, bottom, left, or right swipe gestures.

Although electronic device 100 includes at least two electrodes, the number of electrodes is non-limiting, and improved accuracy and granularity in handedness determination, gesture detection, and hand reach may be contemplated with added electrodes.

In embodiments, electrodes 106*a-b* are placed approximately 12 to 16 cm apart. In embodiments, the distance between the user's hand and electrodes 106*a-b* can be from 10 to 40 cm. Typical noise measured at electrodes 106*a-b* is in the order of microvolts ($\mu V$), and the typical measured value at electrodes 106*a-b* is in millivolts (mV). Due to the high impedance (e.g., $10^8 \Omega$ up to $10^{13} \Omega$) on the path between electrodes 106*a-b* and sensor 108, the current flow is minimal (e.g., in the nanoamp (nA) or picoamp (pA) range).

Sensor 108 is coupled to electrodes 106*a-b* via a differential input, and detects the difference in potential (e.g., charge variations) between electrodes 106*a-b*. In embodiments, electrode 106*a* is coupled to a non-inverting input of sensor 108, and electrode 106*b* is coupled to an inverting input of sensor 108. In another embodiment, electrode 106*b* is coupled to a non-inverting input of sensor 108, and electrode 106*a* is coupled to an inverting input of sensor 108.

The balanced behavior between electrodes 106*a-b* attenuates the common sources (e.g., unrelated events to user interacting with electronic device 100) at electrodes 106*a-b* and isolates the difference in amplitude over time between the induced potential at each of electrodes 106*a-b*.

For example, a potential induced at electrode 106*a* received at sensor 108 is compared to a potential induced at electrode 106*b* at each moment in time. If the hand movement or placement is nearer to electrode 106*a*, the potential induced at electrode 106*a* is greater than the potential induced at electrode 106*b*. Sensor 108 amplifies the differential potential corresponding to the difference between the potential induced at electrode 106*a* and electrode 106*b*. Sensor 108 provides a dynamic analog or digital variable associated with the differential potential to processor 102.

In another example, the gesture of hand swiping from electrode 106*a* to electrode 106*b* can induce approximately the same potential in each electrode. However, the potential induced at each electrode is delayed over time as a function of the hand swiping speed. A potential is induced at electrode 106a at time $t_1$ followed by a potential induced at electrode 106b at time $t_2$. Thus, the consolidated differential signal from electrodes 106a-b at sensor 108 includes a first peak at time $t_1$ followed by a second peak at time $t_2$, which are the polar opposite of each other. For example, the first peak is positive, and the second peak is negative, or vice versa.

Interfaces 110a-b are, for example, configurable switches, force-sensitive features, capacitive sensing buttons that allow interfacing by the user with the device through, for example, scrolling, adjusting device volume, powering ON, or the like.

To improve the ingress (IP) protection of electronic device 100, designers have moved away from physical buttons. Instead, they have incorporated virtual buttons, which can adapt dynamically to the side or edge of electronic device 100 based on handedness.

The number of interfaces 110a-b is non-limiting. Additionally, electronic device 100 may include a display (not shown) that allows users to interact with electronic device 100 using software or hardware mechanisms, which can similarly take advantage of the determination of handedness or gesture recognition as disclosed in the embodiments of this disclosure.

Interfaces 110a-b can be configured by processor 102 based on a pre-determined preference for a left-hand and right-hand user interacting with electronic device 100. In embodiments, after determining that the user is right-handed, processor 102 adjusts one or both interfaces 110a-b for a right-hand user. Alternatively, if processor 102 determines that the user is left-handed, processor 102 adjusts one or both interfaces 110a-b for a left-hand user.

In an embodiment, processor 102 determines that a user interacts with electronic device 100 using a left hand or a right hand based on the dynamic variable associated with the differential potential. In another embodiment, processor 102 determines the gesture made by the user based on the dynamic variable related to the differential potential with respect to time.

Figure 2:
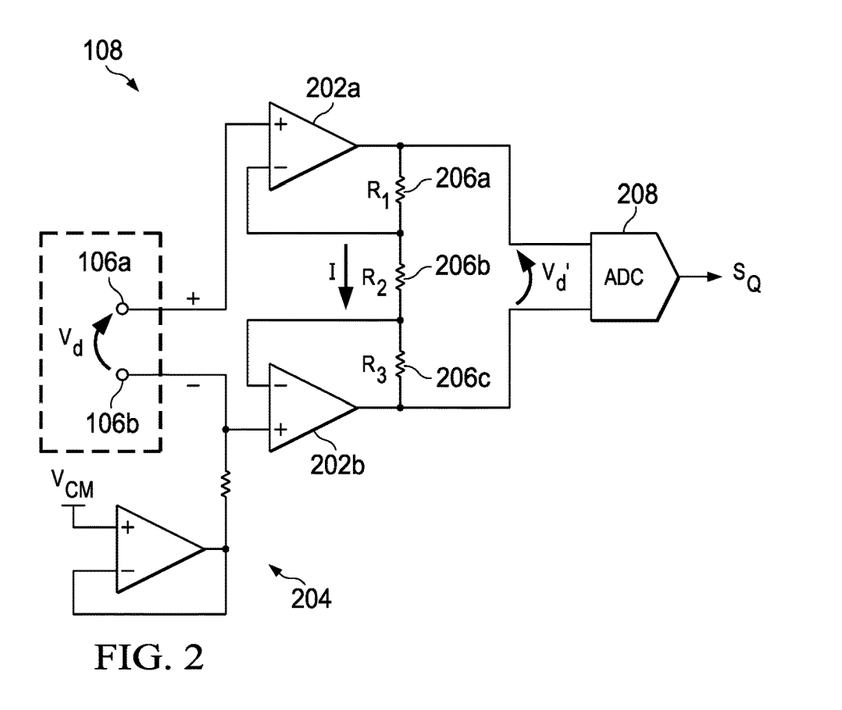
FIG. 2 is a diagram of an embodiment sensor.

FIG. 2 illustrates an embodiment sensor 108, which may be installed in electronic device 100. As shown, sensor 108 includes operational amplifiers 202a-b, biasing stage 204, $R_1$, $R_2$, and $R_3$ resistors 206a-c, and an analog-to-digital converter (ADC) 208. The pair of input electrodes 106a-b represent the differential inputs to sensor 108. The potential difference between electrodes 106a-b is illustrated as voltage $V_d$. The biasing stage 204 (i.e., buffer stage) biases sensor 108 at a common-mode voltage $V_{CM}$.

The inverting terminals of operational amplifiers 202a-b are connected by $R_2$ resistor 206b. The potential difference between electrodes 106a-b generates a current through $R_2$ resistor 206b of $I=V_d/R_2$. This current traverses through $R_1$, $R_2$, and $R_3$ resistors 206a-c, and assuming $R_1=R_3$, an output voltage $V_{d'}$ is produced at the differential input of the ADC 208 given by $V_{d'}=I(2R_1+R_2)$ or equivalently $V_d(2R_1+1)$.

The differential potential $V_{d'}$, which is proportional to the differential potential $V_d$ is supplied to the input of ADC 208. ADC 208 converts the analog voltage to a digital charge-variation signal $S_q$, which is subsequently transferred to processor 102. It is understood that the total gain of sensor 108 depends primarily on $R_2$ resistor 206b and can be, thus, adjusted by the appropriate selection of the value of $R_2$ resistor 206b.

In an embodiment, the charge-variation signal $S_Q$ is a high-resolution (16-bit or 24-bit) digital stream. ADC 208 is optional in so far as processor 102 can be configured to work directly on the analog signal or can itself comprise an analog-to-digital converter adapted to convert the signal $V_{d'}$.

Figure 3:
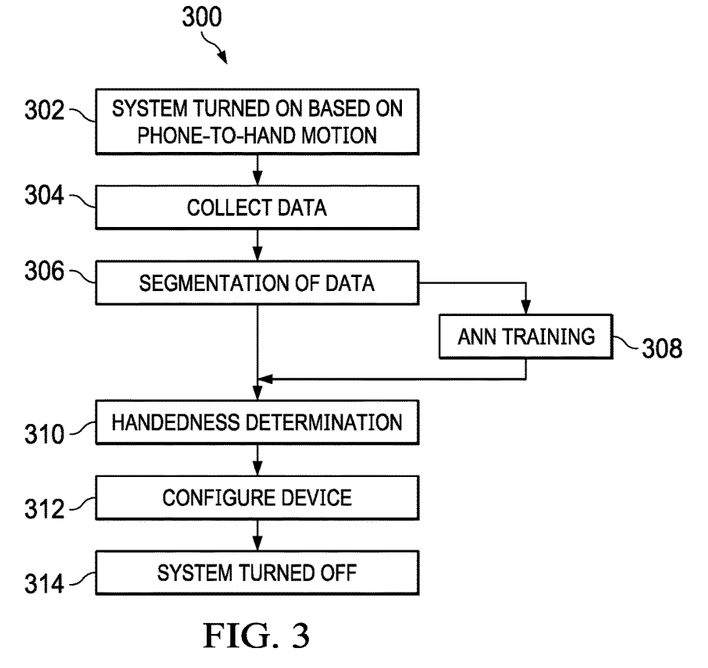
FIG. 3 is a flowchart of an embodiment method for determining handedness.

FIG. 3 is a flowchart of an embodiment method 300 for determining handedness, as may be performed by the determining system of electronic device 100. In the default mode, one or more components of the determining system can be in standby, low-power, or deactivated mode.

At step 302, if the determining system detects a motion, the determining system is turned ON or comes out of low-power standby mode. For example, the determining system can be turned ON based on a phone-to-hand motion. In embodiments, the determining system is continuously running.

In embodiments, the determining system of electronic device 100 may include other sensors. For example, the determining system may include a gyroscope or accelerometer (not shown in FIG. 1). In other embodiments, the electronic device 100 may include sensors such as a gyroscope or an accelerometer, electrically coupled to the determining system of electronic device 100.

Processor 102 can receive a trigger signal from one or more sensors that indicate a movement of electronic device 100. The trigger signal places the processor 102 and associated components of the determining system in active mode or ON mode. In an embodiment, the movement results from the user grasping the electronic device 100 in their hand. In other embodiments, processor 102 may analyze the trigger signal to verify that the movement is due to the user the grasping electronic device 100 and, based thereon, enabling the other components of the determining system.

At step 304, sensor 108 begins collecting data from electrodes 106a-b to read the change in the electrostatic field due to the grasping of electronic device 100 by the user. The induced potential received at sensor 108 from each of electrodes 106a-b is isolated based on the common reference. The differential potential between electrodes 106a-b is amplified and quantized as a digital signal in the form of data relative to time by sensor 108. The data is transferred from sensor 108 to processor 102 for analysis and processing.

In embodiments, the data is stored in memory 104, and the processor 102 retrieves the data from memory 104. In other embodiments, processor 102 receives the data directly from sensor 108.

At step 306, the incoming data from sensor 108 is segmented by processor 102. An initial subset of the incoming data is utilized as training inputs for the artificial neural network. A subsequent subset of the incoming data is used to determine whether the user is using their left or right hand to grasp electronic device 100. In embodiments, the initial subset of the incoming data is also used to determine whether the user is using the left or right hand after training the artificial neural network.

A typical artificial neural network includes multiple artificial neurons or processing units, which are interconnected by nodes. Input units of the artificial neurons receive the data from sensor 108 based on an internal weighting system. In embodiments, the artificial neural network uses the data to learn about the information associated with the placement of the user hand in relation to electronic device 100. The artificial neural network produces a single output based on various rules and guidelines programmed into the artificial neurons.

The training inputs are used during an initial training phase to recognize patterns in the data. The internal weighting system is adjusted based on the outcome of the training phase to produce the lowest possible error.

In embodiments, the internal weighting system may have been initially set by the manufacturer during initial assembly. In embodiments, the internal weighting system may be updated using, for example, an over-the-air update.

In embodiments, the internal weighting system is improved through the training data based on real data derived from real environmental information. For example, when the user sits down, friction is created, which can create static noise. The artificial neural network can be trained to remove this type of unwanted noise from the measurements and fine-tune the determination's accuracy.

In some instances, the artificial neural network can account for subtle and minute variations in the electric field that may not be easily distinguishable in a determining system lacking an artificial neural network processing system.

At step 308, the artificial neural network receives an initial subset of the incoming data over a consecutive time window (e.g., 256 samples) for training and adjusting the internal weighting system.

In embodiments, the artificial neural network may be initially trained with information stored in memory 104. In such an embodiment, the artificial neural network may continuously be updated using, for example, over-the-air software updates or by the training of the artificial neural network using the training data from sensor 108. The updated information may then replace or supplement the initial data used for training the artificial neural network.

In embodiments, once the artificial neural network has enough training data, it can store raw data or algorithms associated with the internal weighting system in memory 104. Subsequent data collected by sensor 108 can then be used without retraining the artificial neural network.

In embodiments, the artificial neural network may continuously, at set times, or at random times retrain the internal weighting system to provide an updated or more accurate model. Thus, the segmentation and training pattern of the model is non-limiting and can be modified to provide an efficient yet precise model.

The number of layers, artificial neurons, and nodes of the artificial neural network is non-limiting. Generally, a complex artificial neural network with many artificial neurons, layers, and nodes can derive a conclusion quicker and with fewer iterations than an artificial neural network having fewer. Thus, the artificial neural network design can be based on finding a balance, for example, between accuracy and required processing power.

At step 310, processor 102 combined with the artificial neural network provides a determination of handedness based on the data from sensor 108. Processor 102 can determine whether the user is left-handed, right-handed, or non-determinative.

In embodiments, the determination of handedness is fine-tuned using information from other sensors such as an accelerometer or gyroscope. For example, data collected over the same time window from other sensors can be fed to the artificial neural network and processor 102 as complementary or additional inputs. The data collected from other sensors corresponding to the motion of lifting and holding electronic device 100 may provide different variables that help distinguish handedness and further improve determination accuracy.

At step 312, processor 102 automatically configures the device for optimal adaptive behavior for the user. After determining that the user is left-handed, right-handed, or non-determinative, processor 102 adjusts interfaces 110a-b for, respectively, the preference of a left-handed, right-handed, or a default right-handed user.

At step 314, the determining system, to conserve power or after sufficient data has been collected and a firm conclusion has been made regarding the handedness, turns OFF or places the determining system in low-power standby mode. In embodiments, in response to determining that electronic device 100 is, for example, in a static position, turns OFF or places the determining system in low-power standby mode.

Figure 4:
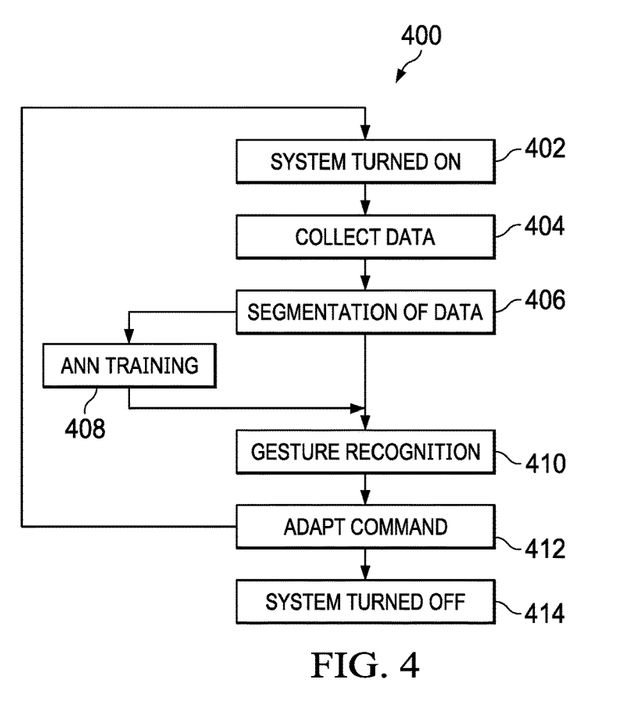
FIG. 4 is a flowchart of an embodiment method for determining hand gestures.

FIG. 4 is a flowchart of an embodiment method 400 for determining hand gestures, as may be performed by the determining system of electronic device 100. The general information and structure referenced in FIG. 3 are similarly applicable to FIG. 4.

In the default mode, one or more components of the determining system can be in standby, low-power, or deactivated mode. At step 402, the determining system is turned ON or comes out of low-power standby mode. In an embodiment, the determining system may be manually activated by the user. In another embodiment, the determining system is activated in response to detecting that electronic device 100 is in a static position, and no motion is detected by one or more sensors electrically coupled to processor 102. In other embodiments, the determining system is continuously running as long as no movement is detected at the electronic device 100.

At step 404, sensor 108 begins collecting signals from electrodes 106a-b to read the change in the electrostatic field. Similar to step 304 in FIG. 3, the induced potential received at sensor 108 from each of electrodes 106a-b is isolated based on the common reference. The differential potential between electrodes 106a-b is amplified and quantized as a digital signal in the form of data relative to time by sensor 108. The data is transferred from sensor 108 to processor 102 for analysis and processing. In embodiments, the data is stored in memory 104, and processor 102 retrieves the data from memory 104. In other embodiments, processor 102 receives the data directly from sensor 108.

At step 406, the incoming data from sensor 108 is segmented by processor 102. An initial subset of the incoming data is utilized as training inputs for the artificial neural network. A subsequent subset of the incoming data is used to determine a hand gesture in relation to electronic device 100. In embodiments, the initial subset of the incoming data is also used to determine a hand gesture in relation to electronic device 100 after training the artificial neural network.

At step 408, an initial subset of the incoming data over a consecutive time window (e.g., 256 samples) is utilized for training the artificial neural network and adjusting the internal weighting system.

At step 410, processor 102, combined with the artificial neural network, recognizes a hand gesture type. Processor 102 can determine whether the movement of the hand (i.e., gesture) is one of, for example, (1) left-to-right swipe, (2) right-to-left swipe, (3) up-to-down swipe, (4) down-to-up swipe, (5) close-to-far, (6) far-to-close, (7), none, or (8) other. The category or type of gesture is non-limiting and additional electrodes strategically placed within or on electronic device 100 can allow for other types of gesture recognition.

Over time, processing of data by processor 102 shows opposite peaks polarities when the hand swipes in opposite directions. Likewise, over time, other types of gestures have unique differential potential measurement patterns associated with hand movement. By relying on this behavioral pattern, processor 102 can determine the direction of a gesture in the proximity of electrodes 106a-b.

In a dual-electrode setup, the spatial configuration provided by electrodes 106a-b, placed diagonally from each other, allows gesture recognition differentiation from left, right, top, and bottom of the device.

At step 412, processor 102 adapts an input or output interface based on the determination of the type of gesture. For example, a far-to-close gesture may be configured to increase the volume of electronic device 100. Another example is a left-to-right gesture configured to go to the next song in a playlist.

At step 414, the determining system, to conserve power or after detecting using one or more sensors a movement of electronic device 100 (e.g., the user directly interacting with electronic device 100 by lifting), turns OFF or places the determining system in low-power standby mode.

In some embodiments, the determining system is manually turned OFF or placed in low-power standby mode. Alternatively, the determining system may return to step 402 to monitor the next gesture.

It is noted that the order of steps shown in FIGS. 3 and 4 is not absolutely required, so in principle, the various steps may be performed out of the illustrated order. Also, certain steps may be skipped, different steps may be added or substituted, or selected steps or groups of steps may be performed in a separate application.

Figure 5A:
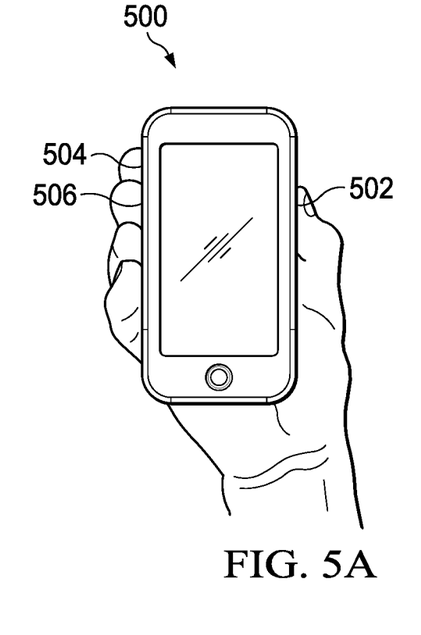
FIGS. 5a-b are diagrams of the general holding arrangement of a right-hand user and a left-hand user of an electronic device.
Figure 5B:
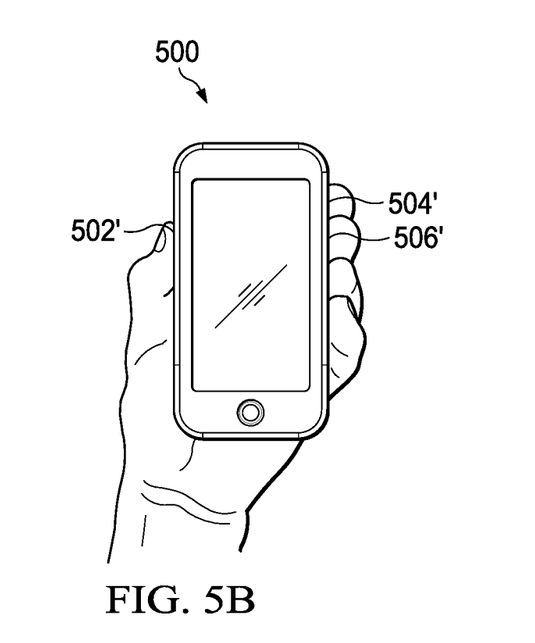

FIG. 5a-b illustrate, respectively, the general holding arrangement of a right-hand user and a left-hand user of an electronic device 500.

As shown in FIG. 5A, the right-hand user generally prefers to use the right thumb to turn the electronic device 500 ON or OFF using the power button 502 and the index or middle finger to adjust the volume using the volume UP switch 504 and volume DOWN switch 506.

As shown in FIG. 5B, the left-hand user generally prefers to use the left thumb to turn the electronic device 500 ON or OFF using the power button 502' and the index or middle finger to adjust the volume using the volume UP switch 504' and volume DOWN switch 506'.

In an electronic device where the placement of the power button 502 and 502', volume UP switch 504 and 504', and volume DOWN switch 506 and 506' are automatically configurable, the user can more efficiently interact with the electronic device and, thus, is not burdened with holding the device in an uncomfortable position.

In the present description, when reference is made to terms qualifying absolute positions, such as terms "front," "back," "top," "bottom," "left," "right," etc., or relative positions, such as terms "above," "under," "upper," "lower," etc., or to terms qualifying directions, such as terms "horizontal," "vertical," etc., it is referred to the orientation of the drawings.

Unless otherwise specified, when reference is made to two elements electrically connected together, this means that the elements are directly connected with no intermediate element other than conductors. When reference is made to two elements electrically coupled together, this means that the two elements may be directly coupled (connected) or coupled via one or a plurality of other elements.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A circuit for a device, the circuit comprising:
   a first passive electrode configured to be placed at a first location on the device;
   a second passive electrode configured to be placed at a second location on the device, the first location and the second location being different locations on the device, the first passive electrode and the second passive electrode being configured to sense a variation in an electrostatic field in response to a user interacting with the device;
   a sensor coupled to the first passive electrode and the second passive electrode, the sensor configured to detect a differential potential between the first passive electrode and the second passive electrode; and
   a processing circuit coupled to the sensor, the processing circuit configured to determine whether the user is interacting with the device using a left hand or a right hand, the determining based on data received from the sensor corresponding to the differential potential.

2. The circuit of claim 1, wherein the device is a handheld device, and wherein the processing circuit is further configured to update an interface on the device in response to determining whether the user is interacting with the device using the left hand or the right hand, the interface used by the user to interact with the device.

3. The circuit of claim 1, wherein the user interacting with the first passive electrode comprises a transfer of electric charge, a charge induction, or a charge polarization at the first passive electrode.

4. The circuit of claim 1, wherein passively sensing the variation in the electric field comprises sensing an electric potential induced at the first passive electrode in response to the user interacting with the first passive electrode.

5. The circuit of claim 1, wherein the sensor is further configured to:
   attenuate signal noise from the differential potential based on signals received from the second passive electrode, the signal noise corresponding to events unrelated to the user interacting with the first passive electrode; and
   amplify the differential potential after attenuating the signal noise.

6. The circuit of claim 1, further comprising a plurality of passive electrodes, wherein the first passive electrode is configured to have a common reference with each of the other passive electrodes.

7. The circuit of claim 1, further comprising an on-device machine learning capable process, wherein the determining further comprises determining based on an artificial neural network model.

8. The circuit of claim 1, wherein the first passive electrode is placed diagonally in relation to the second passive electrode on a plane parallel to a back-side of the device.

9. The circuit of claim 1, wherein the plurality of passive electrodes are exposed on a surface of the device, and the user interacting with the device comprises the user directly touching the first passive electrode.

10. The circuit of claim 1, wherein one or more of the plurality of passive electrodes are placed underneath a surface of a device, and the user interacting with the device comprises the user touching a dielectric cap placed between the first passive electrode and a contact point on the device.

11. A method, comprising:
sensing a first variation in an electric polarization at a first passive electrode of a device and a second variation in an electric polarization at a second passive electrode of the device located at a different location from the first electrode on the device;
measuring a differential potential between the first passive electrode and the second passive electrode in response to a user interacting with the device; and
determining whether the user is interacting with the device using a left hand or a right hand based on the differential potential.

12. The method of claim 11, further comprising updating an interface on the device in response to determining whether the user is interacting with the device using the left hand or the right hand, the interface used by the user to interact with the device.

13. The method of claim 11, wherein the user interacting with the first passive electrode comprises a polarization or a charge induction or a transfer of electric charge from the user to the first passive electrode.

14. The method of claim 11, wherein passively sensing the variation in the electric field comprises sensing an electric potential induced at the first passive electrode in response to the user interacting with the first passive electrode.

15. The method of claim 11, wherein the detecting comprises:
attenuating signal noise from the differential potential based on signals received from the second passive electrode, the signal noise corresponding to events unrelated to the user interacting with the first passive electrode; and
amplifying the differential potential after attenuating the signal noise.

16. The method of claim 11, wherein the determining further comprises determining based on an artificial neural network model.

17. The method of claim 16, wherein a training of the artificial neural network model is based on an initial subset of data corresponding to the differential potential.

18. The method of claim 11, further comprising:
activating a sensor for the measuring of the differential potential in response to detecting a displacement of the device; and
deactivating the sensor in response to detecting that the device is in a static position for a threshold period of time.

19. A device, comprising:
a first passive electrode configured to be placed at a first location on the device;
a second passive electrode configured to be placed at a second location on the device, the first location and the second location being different locations on the device, the first passive electrode and the second passive electrode being configured to sense a variation in an electric field in response to a user interacting with the device;
a non-transitory memory storage comprising instructions; and
a processor in communication with the non-transitory memory storage, the first passive electrode, and the second passive electrode, wherein the processor is configured to execute the instructions to:
detect a differential potential between the first passive electrode and the second passive electrode, and
determine whether the user is interacting with the device using a left hand or a right hand, the determining based on data received from the sensor corresponding to the differential potential.

20. The device of claim 19, wherein the processor is configured to execute the instructions to update an interface on the device in response to determining whether the user is interacting with the device using the left hand or the right hand, the interface used by the user to interact with the device.

21. The device of claim 19, wherein passively sensing the variation in the electric field comprises sensing an electric potential induced at the first passive electrode in response to the user interacting with the first passive electrode.

22. The device of claim 19, wherein the processor is configured to execute the instructions to:
attenuate events unrelated to the user interacting with the first passive electrode based on signals received from the other passive electrodes; and
amplify an electric potential induced at the first passive electrode in response to a signal received from the first passive electrode.

23. The device of claim 19, wherein the determining further comprises determining based on an implementation of an artificial neural network.

24. The device of claim 23, wherein a training of the artificial neural network is based on an initial subset of data corresponding to the differential potential.

25. A method, comprising:
passively sensing a change in a first electric field at a first passive electrode of a device and a change in a second electric field at a second passive electrode of the device located at a different location from the first passive electrode on the device;
detecting a variation in differential potential based on the first electric field and the second electric field in response to a movement of an object relative to the device; and
determining a direction of motion of the object relative to the device based on the variation in the differential potential.

26. The method of claim 25, wherein the variation in the differential potential corresponds to a variation over time in accordance with placement of the first passive electrode with respect to the second passive electrode.

* * * * *